United States Patent [19]

Burns et al.

[11] Patent Number: 5,001,748

[45] Date of Patent: Mar. 19, 1991

[54] RINGING SIGNAL GENERATOR

[75] Inventors: Robert V. Burns; Sanjay Gupta, both of Phoenix, Ariz.

[73] Assignee: Siemens Transmission Systems, Inc., Phoenix, Ariz.

[21] Appl. No.: 396,583

[22] Filed: Aug. 21, 1989

[51] Int. Cl.$^5$ .............................................. H04M 3/02
[52] U.S. Cl. ..................................... 379/418; 379/252
[58] Field of Search ............... 379/418, 350, 252, 253

[56] References Cited

U.S. PATENT DOCUMENTS

| | | | |
|---|---|---|---|
| 2,851,533 | 9/1958 | Pharis | 379/350 X |
| 4,220,826 | 9/1980 | Kiss | 379/418 |
| 4,349,703 | 9/1982 | Chea, Jr. | 379/418 X |
| 4,362,908 | 12/1982 | Melindo | 379/418 X |
| 4,399,499 | 8/1983 | Butcher et al. | 363/17 |
| 4,500,844 | 2/1985 | Lisco | 379/418 |
| 4,611,097 | 9/1986 | Grimes | 379/253 |
| 4,656,659 | 4/1987 | Chea, Jr. | 379/253 |
| 4,703,500 | 10/1987 | Pollard | 379/252 |
| 4,734,936 | 3/1988 | Tanaka et al. | 379/253 |

FOREIGN PATENT DOCUMENTS

| | | | |
|---|---|---|---|
| 0199262 | 10/1985 | Japan | 379/418 |
| 0078067 | 3/1989 | Japan | 379/418 |

Primary Examiner—James L. Dwyer
Assistant Examiner—M. Shehata
Attorney, Agent, or Firm—Jeffrey P. Morris; David N. Caracappa

[57] ABSTRACT

A ringing signal generator includes a low power signal generator for generating a relatively low power signal representing a ringing signal, a bipolar pulse generator for generating a series of bipolar pulses having widths representing the amplitude of the low power signal, wherein adjoining pulses have opposite polarities, and a high power ringing signal generator for producing a high power ringing signal in response to the series of bipolar pulses. An analog sine wave signal is superimposed upon a DC bias signal to produce the low power signal.

13 Claims, 2 Drawing Sheets

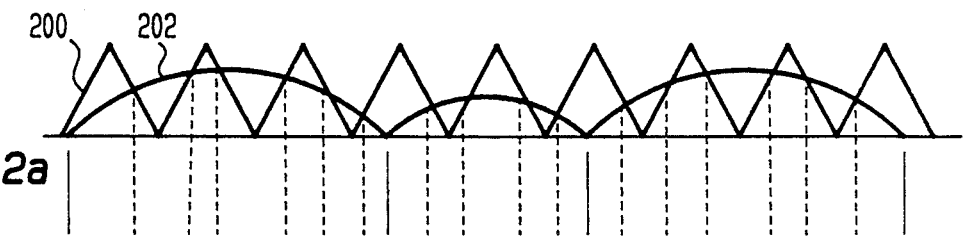
FIG. 2a
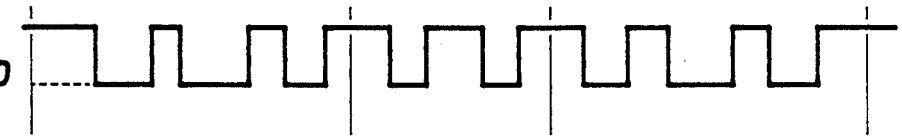
FIG. 2b
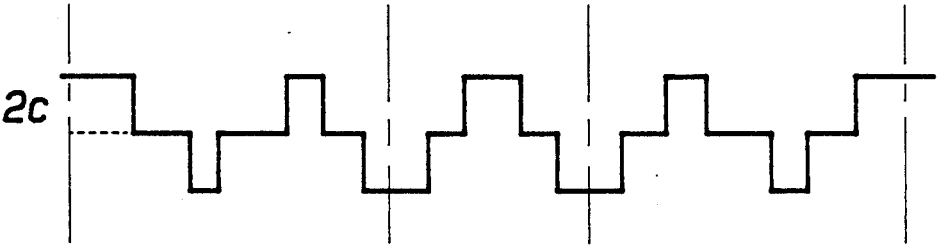
FIG. 2c
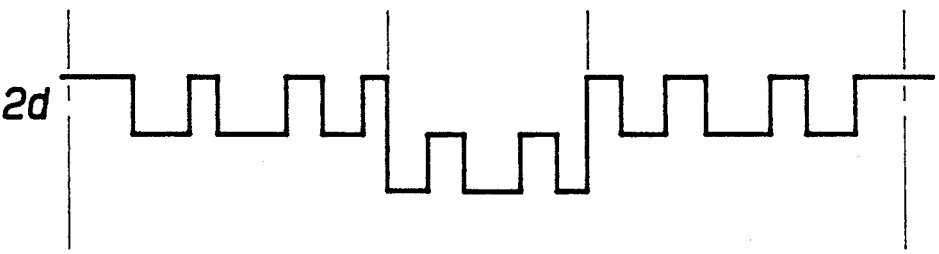
FIG. 2d
FIG. 3
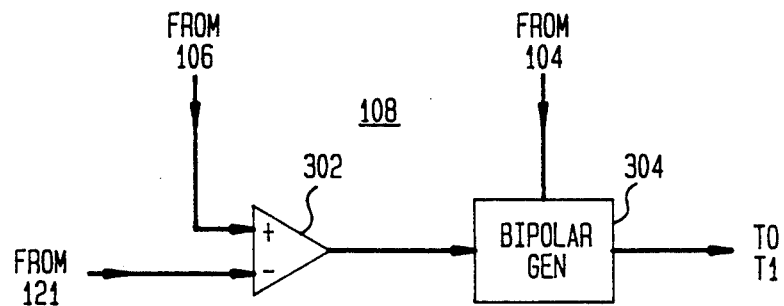

RINGING SIGNAL GENERATOR

The present invention relates to a ringing signal generator for a central office of a telephone system.

Ringing signal generators in central offices of telephone systems produce the signals required to ring the subscriber telephone instruments. There are several different ringing signals which are used in the United States. For example, one ringing signal is a 20 Hz sine wave signal having a voltage of 86 volts rms. Other frequencies and voltages also exist. In addition, some ringing signals consist of AC components superimposed on a DC bias voltage. For example, one such ringing signal consists of the 20 Hz AC component, described above, superimposed on a +42 volt DC bias signal; or the AC component superimposed on a −42 volt DC bias signal. Ringing signal generators generating such superimposed ringing signals may be used in known manner in multiuser telephone systems. For protection purposes, such a ring signal generator must be electrically isolated from the actual tip and ring signal wires connected to the telephone instruments. This is normally done using the magnetic coupling supplied by transformers.

U.S. Pat. No. 4,399,499, issued Aug. 16, 1983 to Butcher et al. entitled BI-LATERAL FOUR QUADRANT POWER CONVERTER, describes a power converter which may be used to generate ring signals. In this U.S patent, a digital representation of an input data signal is pulse width modulated (PWM). The PWM signal is converted to a series of bipolar pulses such that when the input data signal is positive, all the pulses are of one polarity, and when the input data signal is negative, all the pulses are of the other polarity. This PWM signal is then transformer coupled to a synchronous rectifier which generates the high power signal.

U.S. Pat. No. 4,349,703, issued Sept. 14, 1982 to Chea, Jr. entitled PROGRAMMABLE RING SIGNAL GENERATOR, describes a ringing signal generator for generating a ring signal consisting of an AC component superimposed on a DC bias. In this U.S. patent, a relatively low power analog signal representing the desired ringing signal is generated. This ringing signal is then pulse width modulated. The pulse width modulated signal is then transformer coupled to a synchronous rectifier which produces the high power ringing signal. The ringing signal is then coupled to the tip and ring signal wires.

Both of the above circuits, however, provide a signal to a transformer which has a relatively large DC component and relatively low frequency AC components. This requires a transformer which is relatively large, to pass the lower frequency AC components, thus increasing the cost of such a ringing signal generator. In addition, the transformer dissipates the DC component as wasted heat, thus increasing the power requirement of such a ringing signal generator. An improved ringing signal generator is desireable which minimizes the size of the transformer, decreasing the cost of such a ringing signal generator, and which minimizes the power dissipation of the ringing signal generator.

In accordance with principles of the present invention, a ringing signal generator comprises means for generating a relatively low power signal representing the ringing signal. Means, coupled to the low power signal generating means, generate a series of bipolar pulses having widths representing the amplitude of the low power signal. Adjoining pulses have opposite polarities. Finally, means, coupled to the bipolar pulse generating means, produce the high power ringing signal in response to the series of bipolar pulses.

In the drawings:

FIG. 2 is a waveform diagram useful in understanding the operation of the ringing signal generator illustrated in FIG. 1; and FIG. 3 is a more detailed block diagram of a PWM generator which may be used in the ringing signal generator illustrated in FIG. 1.

Figure 1:
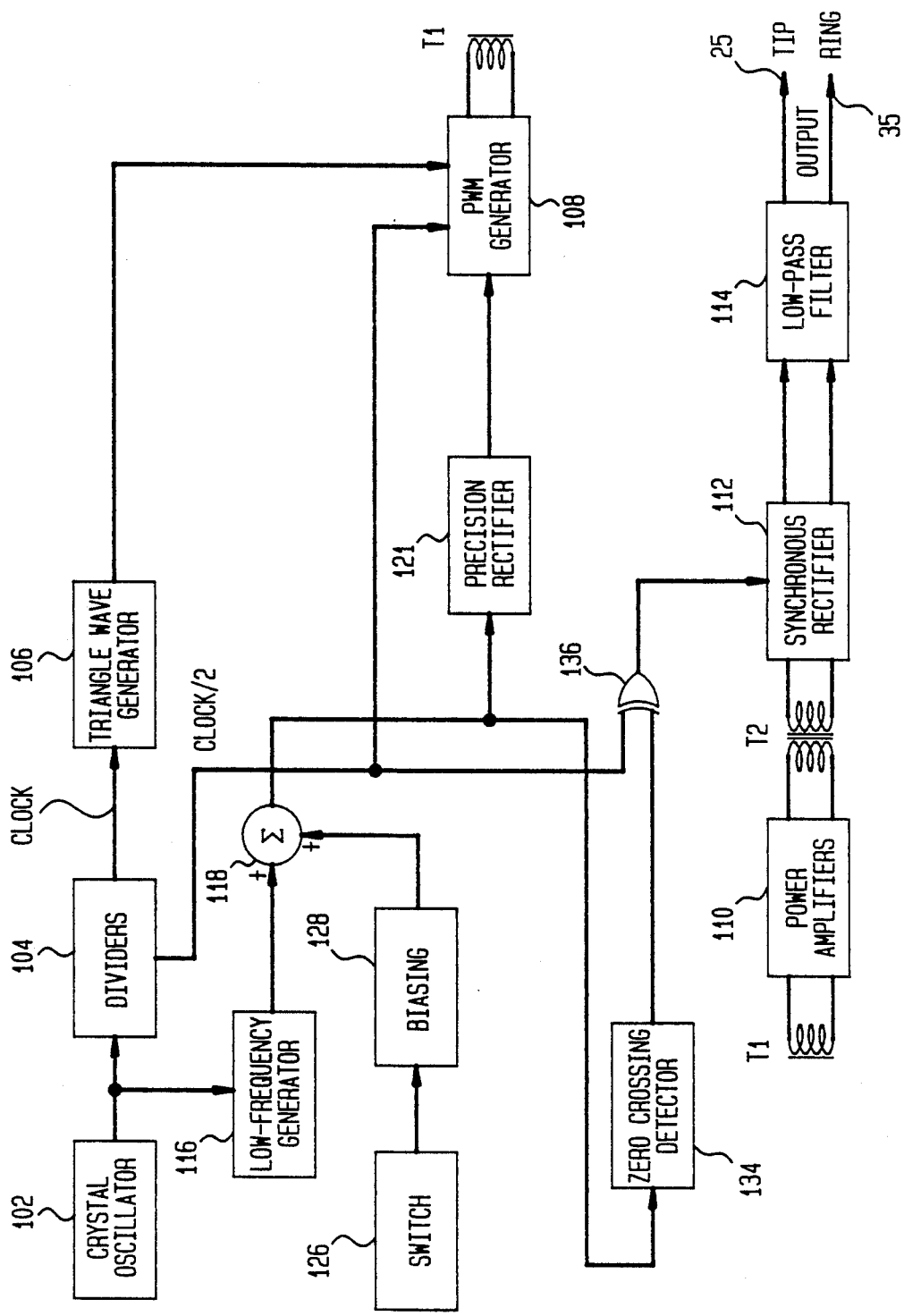
FIG. 1 is a block diagram of a ringing signal generator according to the present invention.

FIG. 1 is a block diagram of a ringing signal generator. Only those elements which are essential to making and using the invention are illustrated in detail in FIG. 1. A person skilled in the art of telephone ringing signal generators will know what additional circuitry is required and how to construct it in the usual manner.

In FIG. 1, a crystal oscillator 102 has an output terminal coupled to respective input terminals of a chain of frequency dividers 104 and a low frequency sine wave generator 116. A first output terminal of the frequency dividers 104 is coupled to an input terminal of a triangle wave generator 106, and carries a clock signal (Clock) having a predetermined frequency. For example, the Clock signal may be a digital clock signal. An output terminal of the triangle wave generator 106 is coupled to a first control input terminal of a pulse width modulated (PWM) signal generator 108, and carries a triangle wave which is in synchronism with the Clock signal. For example, the boundary of the triangle wave may be aligned with the leading edge of the Clock signal. An output terminal of the PWM 108 is coupled to a primary winding of a first transformer T1.

A secondary winding of the transformer T1 is coupled to an input terminal of a power amplifier 110. An output terminal of the power amplifier 110 is coupled to a primary winding of a second transformer T2. A secondary winding of transformer T2 is coupled to a signal input terminal of a synchronous rectifier 112. An output terminal of the synchronous rectifier 112 is coupled to an input terminal of a low pass filter (LPF) 114. Respective output terminals of the LPF 114 are coupled to output terminals 25 and 35, which are coupled to tip and ring signal wires, respectively, which are coupled to the ringer of a subscriber telephone instrument (not shown).

An output terminal of the low frequency sine wave generator 116 is coupled to a first input terminal of a summing circuit 118. An output terminal of the summing circuit 118 is coupled to respective input terminals of a zero crossing detector 134 and a precision rectifier 121. An output terminal of the precision rectifier 121 is coupled to a signal input terminal of the PWM generator 108.

A second output terminal of the frequency dividers 104 is coupled to a first input terminal of an exclusive-OR gate 136 and to a second control input terminal of the PWM generator 108 and carries a signal (Clock/2) having a frequency which is one-half of the predetermined frequency of the Clock signal. For example, the Clock/2 signal may be a digital clock signal which is a logic '1' signal for one triangle wave, and a logic '0' for the next triangle wave, and so forth. An output terminal of the zero crossing detector 134 is coupled to a second input terminal of the exclusive-OR gate 136. An output terminal of the exclusive-OR gate is coupled to a clock input terminal of the synchronous rectifier 112.

A user controlled switch 126 has an output terminal coupled to a biasing voltage source 128. An output terminal of the biasing voltage source 128 is coupled to a second input terminal of the summing circuit 118.

The operation of the ringing signal generator illustrated in FIG. 1 may be better understood by reference to the waveforms illustrated in FIG. 2. In operation, the combination of the crystal oscillator and the frequency dividers 104 are used to derive the various signals. The low frequency sine wave generator 116 may, for example, utilize a switched capacitor filter to generate a 20 Hz sine wave signal in response to the clock signal from the crystal oscillator 102. The combination of the user controlled switch 126 and biasing circuit 128 produces a voltage which biases the sine wave from the sine wave generator 116. This DC bias voltage is selected by the user via user controlled switch 126, and is either a positive bias voltage, a negative bias voltage or no bias at all, corresponding to the desired ringing signal. (In the remainder of the description, it will be assumed that the AC component will be superimposed on a DC bias.)

The output of the low frequency sine wave generator 116 is added to a DC bias voltage in the summing circuit 118. The output of the summing circuit 118 is a low frequency and relatively low power sine wave, possibly superimposed on either a positive or negative DC bias voltage. This signal is supplied to precision rectifier 121. The output of the precision rectifier 121 is supplied to the signal input terminal of the PWM generator 108. In FIG. 2a, waveform 202 represents the output of the precision rectifier 121.

Frequency dividers 104 produce a signal (Clock) which has a frequency equal to the frequency of the triangular wave use to produce the PWM signal representing the output of the precision rectifier. Triangle wave generator 106 produces a triangle wave in response to the Clock signal. In FIG. 2a, waveform 200 represents the output of the triangle wave generator 106. It will be understood by one skilled in the art, that the representative waveform 200 in FIG. 2a is not to scale, and in reality would have a higher frequency.

The PWM generator 108 produces a bipolar signal consisting of a series of pulses having widths which represent the amplitude of the rectified DC biased sine wave signal at the signal input terminal, in which every other pulse is of opposite polarity. FIG. 2c is a waveform diagram of such a series of bipolar PWM pulses. PWM generator 108 is described in more detail below.

This series of bipolar PWM pulses is supplied to power amplifier 110 through pulse transformer T1. A power amplified series of bipolar PWM pulses is supplied to a synchronous rectifier 112 through transformer T2. The synchronous rectifier operates in a known manner to either invert or not invert the polarity of an input pulse in response to the state of a logic signal at its control terminal. The control logic signal is produced by exclusive-OR gate 136. Zero crossing detector 134 operates in a known manner to produce a logic signal having a first state when the DC biased sine wave signal is greater than zero, and a second state otherwise. For example, zero crossing detector 134 may produce a logic '1' signal when the DC biased sine wave signal is greater than zero, and a logic '0' signal when it is less than zero. The Clock/2 signal, from dividers 104, may, for example, be a logic '1' signal for one period of the triangle wave 200, and a logic '0' for the next, and so on.

The synchronous recitifier uses the output from exclusive-OR gate 136 to control its operation, as described above. FIG. 2d is a waveform diagram of the output of the synchronous rectifier 112.

The signal represented by FIG. 2d, when passed through the LPF 114 is a high power version of the desired DC biased sine wave signal which may be coupled, in known manner, to the tip or ring signal wires by switches (not shown) to ring the desired telephone instrument.

FIG. 3 is a more detailed block diagram of a PWM generator 108, which may be used in the ringing signal generator illustrated in FIG. 1. In FIG. 3, the output signal from precision rectifier 121 (of FIG. 1) is coupled to an inverting input terminal of a comparator 302. An output terminal of comparator 302 is coupled to a signal input terminal of a bipolar pulse generator 304. An output terminal of bipolar generator 304 is coupled to the primary winding of pulse transformer T1. The signal from the triangle wave generator 106 is coupled to the non-inverting input terminal of the comparator 302. The Clock/2 signal from the dividers 104 is coupled to the control input terminal of bipolar generator 304.

In operation, comparator 302 operates in a known manner to produce a PWM signal representing the amplitude of the input signal from precision rectifier 121 (of FIG. 1). Waveform 2b represents the output signal from comparator 302. Bipolar generator 304 operates, also in a known manner, to produce a sequence of pulses having a polarities dependent upon the state of the logic signal from the dividers 104. For example, if the Clock/2 signal is a logic '1' signal, then any pulse produced by the comparator 302 is translated into a first polarity, and if the Clock/2 signal is a logic '0' signal, then any pulse produced by the comparator 302 is translated into a second polarity. FIG. 2c is a waveform representing the signal produced by bipolar generator 304.

A ringing signal generator according to the present invention passes a signal represented by FIG. 2c through the transformers. This signal has frequencies in the neighborhood of the frequency of the triangle wave, which is typically about 16kHz. This means that the transformers may be relatively small, thus decreasing circuit cost. In addition, the DC component of the waveform represented by FIG. 2c is small, thus decreasing power consumption.

An analog circuit is described above, with reference to FIGS. 1 and 3. It should be understood that the low power signal representing the desired ringing signal may be in multibit digital form.

What we claim is:

1. A ringing signal generator, comprising:
means for generating a relatively low power signal representing a ringing signal;
means, coupled to said low power signal generating means, for generating a series of bipolar pulses having widths representing the amplitude of said low power signal, wherein adjoining pulses have opposite polarities; and
means, coupled to said bipolar pulse generating means, for producing a high power ringing signal in response to said series of bipolar pulses;
wherein said low power signal generating means includes:
an oscillator;
means, coupled to said oscillator, for generating an analog sine wave signal;

means for generating a DC bias signal; and means, coupled to said analog wave signal generating means, and to said DC bias signal generating means, for superimposing said analog sine wave signal upon said DC bias signal to produce said low power signal.

2. The ringing signal generator of claim 1, wherein said bipolar pulse generating means comprises a pulse width modulator.

3. The ringing signal generator of claim 2, wherein said pulse width modulator comprises:

means for producing a clock signal;

means, responsive to said clock signal, for generating a triangle wave; and a comparator, responsive to said triangle wave, and said low power signal; and a bipolar pulse generator, coupled to said comparator and responsive to said clock signal, for producing said series of bipolar pulses.

4. The ringing signal generator of claim 1, wherein said bipolar pulse generating means includes:

means for producing a clock signal;

a rectifier responsive to said relatively low power signal; and a pulse width modulator, coupled to said rectifier and responsive to said clock signal.

5. The ringing signal generator of claim 4, wherein said high power ringing signal producing means comprises:

a synchronous rectifier, responsive to said series of bipolar pulses, and having a control input terminal;

a zero crossing detector responsive to said relatively low power signal; and an exclusive-OR gate, having a first input terminal coupled to said zero crossing detector, a second input terminal responsive to said clock signal and an output terminal coupled to said control input terminal of said synchronous rectifier.

6. The ringing signal generator of claim 4, wherein said pulse width modulator comprises:

a triangle wave generator, responsive to said clock signal; and a comparator responsive to said triangle wave, and said low power signal; and a bipolar pulse generator, coupled to said comparator and responsive to said clock signal, for producing said series of bipolar pulses.

7. The ringing signal generator of claim 1, wherein said high power ringing signal producing means comprises:

a synchronous rectifier, coupled to said bipolar pulse generating means and responsive to said relatively low power signal; and a low pass filter, coupled to said synchronous rectifier.

8. The ringing signal generator of claim 1, wherein said high power ringing signal producing means comprises a power amplifier.

9. The ringing signal generator of claim 1, further comprising a transformer coupled between said bipolar pulse generating means and said high power ringing signal producing means.

10. A ringing signal generator, comprising:

means for generating a relatively low power signal representing a ringing signal;

means, coupled to said low power signal generating means, for generating a series of bipolar pulses having widths representing the amplitude of said low power signal, wherein adjoining pulses have opposite polarities; and means, coupled to said bipolar pulse generating means, for producing a high power ringing signal in response to said series of bipolar pulses;

wherein said bipolar pulse generating means comprises a pulse width modulator including:

means for producing a clock signal;

means, responsive to said clock signal, for generating a triangle wave;

a comparator, responsive to said triangle wave, and said low power signal; and a bipolar pulse generator, coupled to said comparator and responsive to said clock signal, for producing said series of bipolar pulses.

11. A ringing signal generator, comprising:

means for generating a relatively low power signal representing a ringing signal;

means, coupled to said low power signal generating means, for generating a series of bipolar pulses having widths representing the amplitude of said low power signal, wherein adjoining pulses have opposite polarities; and means, coupled to said bipolar pulse generating means, for producing a high power ringing signal in response to said series of bipolar pulses;

wherein said bipolar pulse generating means includes:

means for producing a clock signal;

a rectifier responsive to said relatively low power signal; and a pulse width modulator, coupled to said rectifier and responsive to said clock signal.

12. The ringing signal generator of claim 11, wherein said high power ringing signal producing means comprises:

a synchronous rectifier, responsive to said series of bipolar pulses, and having a control input terminal;

a zero crossing detector responsive to said relatively low power signal; and an exclusive-OR gate, having a first input terminal coupled to said zero crossing detector, a second input terminal responsive to said clock signal and an output terminal coupled to said control input terminal of said synchronous rectifier.

13. The ringing signal generator of claim 11, wherein said pulse width modulator comprises:

a triangle wave generator, responsive to said clock signal;

a comparator, responsive to said triangle wave, and said low power signal; and a bipolar pulse generator, coupled to said comparator and responsive to said clock signal, for producing said series of bipolar pulses.

* * * * *